May 13, 1924. Re. 15,840

H. C. RIEHLE

EXPANSION JOINT

Original Filed June 7, 1918

Inventor
Henry C. Riehle
By His Attorney
Edmund G. Borden

Reissued May 13, 1924. Re. 15,840

UNITED STATES PATENT OFFICE.

HENRY C. RIEHLE, OF DOWNERS GROVE, ILLINOIS, ASSIGNOR TO STANDARD ASPHALT & REFINING COMPANY, OF CHICAGO, ILLINOIS, A CORPORATION OF DELAWARE.

EXPANSION JOINT.

Original No. 1,329,631, dated February 3, 1920, Serial No. 238,647, filed June 7, 1918. Application for reissue filed November 27, 1920. Serial No. 426,886.

*To all whom it may concern:*

Be it known that I, HENRY C. RIEHLE, a citizen of the United States, residing at Downers Grove, in the county of Du Page and State of Illinois, have invented new and useful Improvements in Expansion Joints, of which the following is a specification.

This invention relates to expansion joints for concrete and other pavements for streets, alleys, roads, reservoirs and building construction generally, and particularly to a novel and improved construction of filler adapted to be placed in position between adjacent portions or elements of the surface of the pavement to close the joints or intervening spaces, while permitting the portions or elements of the pavement to have proper relative movements to compensate for expansion and contraction.

One object of my invention is to provide an expansion joint filler which combines all of the advantages of the built up or sandwich joint and the solid asphalt joint, while free from the defects of both, and which is sufficiently stiff and rigid to maintain its shape and the integrity of the joint, and substantial enough to screed to, and which is furthermore, adapted to rivet or adhere to the sides of the joint and seal the same securely against the entrance of moisture and other foreign substances.

Another object of the invention is to provide a prepared or preformed filler which may be conveniently handled, packed and shipped, and which is especially adapted to form a durable and even surface which will allow the wheels of vehicles to pass smoothly and easily over the joints.

The invention consists of the features of construction, combination and arrangement of parts, hereinafter fully described and claimed, reference being had to the accompanying drawing, in which:—

Figure 1:
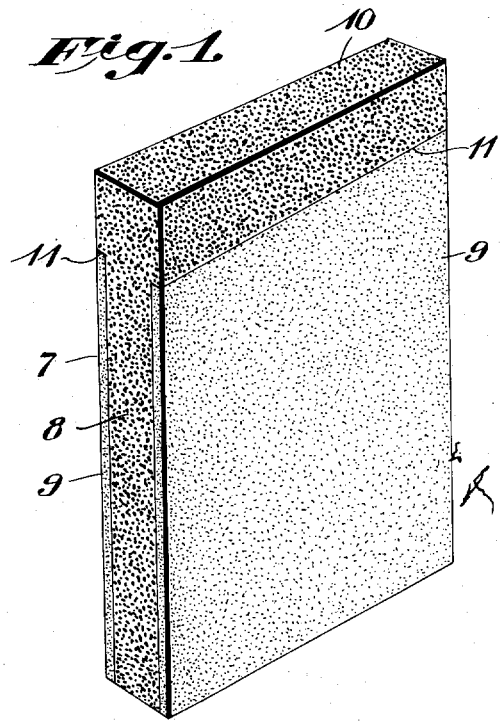
Fig. 1 is a perspective view of a section of an expansion joint filler strip constructed in accordance with my invention.
Figure 2:
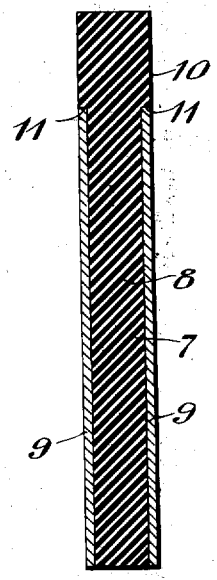
Fig. 2 is a vertical transverse section thereof.
Figure 3:
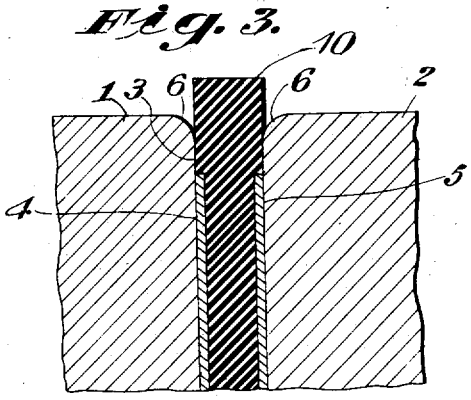
Fig. 3 is a vertical section through adjacent elements of a pavement at a joint, showing the filler placed in a position and as it appears previous to the ironing down of its mashable head or top.

Referring to drawing, 1 and 2 represent the adjacent strips or slabs of a pavement, which may be of concrete, stone or other material, and which are provided between their adjacent surfaces with an intervening space 3 to permit the pavement sections or elements to have proper movement to compensate for expansion and contraction. Ordinarily these joints or spaces are filled with a joint filling material of a character designed to seal the spaces while permitting of proper relative movement of the pavement sections or elements.

The object of my invention is to provide a preformed joint filler of novel construction, adapted to be placed in the spaces or joints between adjacent pavement sections to permit relative movement thereof, while at the same time sealing the joint against the entrance of moisture or other foreign materials and providing a proper wearing surface across the top of the joint. As shown in the present instance, the juxtaposed sides or walls 4 and 5 of the pavement sections 1 and 2 are preferably beveled or chamfered at their upper edges, as indicated at 6, to provide for the better reception of the filling material and to secure close adhesion between such material and the pavement sections, as hereinafter fully described.

The joint filler 7 provided, in accordance with my invention, consists of a strip or slab of rectangular or oblong rectangular form, of a width according substantially with the width of the joint space 3, and of a length or depth slightly greater than said joint space. This joint filler strip is of composite construction, consisting of a body 8 of a suitable elastic and adhesive material and layers 9 of an elastic and protective material disposed on opposite sides thereof.

In practice, the body 8 of elastic and adhesive material may consist of a combination of asphalt and an inert substance, such, for instance, as a substantially pure asphaltic bitumen and finely divided particles of infusorial earth, combined in proper proportions to form a mass sufficiently rigid or solid to maintain its shape and sufficiently plastic and flexible so as to spread under pressure and to permit the filler to readily conform to the shape of a joint. As shown, the protective layers 9 are laid into recesses formed in the sides of the body 8, which recesses and layers 9 are of less length than the asphaltic body. The asphaltic body is thus provided with a projecting top portion 10 in the form of a T-head, which is laterally expanded or of greater width than the body of the filler. By this construction shoulders 11 are formed at the base of the projecting sides of the head 10, against which the upper edges of the layers 9 snugly abut, the arrangement being such that the outer faces of the layers 9 lie substantially flush with the sides of the head 10, forming a composite article which is of the same thickness throughout.

The layers 9 are preferably made of a suitable elastic, fibrous material, such as felt, and the purpose of these layers is to permit and provide for ample elasticity to adapt the filler to snugly fill the space 3 and allow expansion and contraction of the paving elements 1 and 2, while at the same time reinforcing the asphaltic body and rendering the filler strip capable of being handled and shipped with convenience, by the construction described, whereby the filler strip is made of uniform width or thickness from end to end, a number of such strips may be easily and conveniently laid upon one another and packed for storage or shipment in a ready and compact manner, as will be readily understood.

In employing the joint filler, the filler is placed in position so that the felt layers 9 will terminate one inch more or less below the surface of the pavement sections 1 and 2, and so that the lower portion of the head 10 will lie below said surface, while the upper portion of the head 10 will project a sufficient distance, an inch, more or less, above said surface. When so disposed it will be evident that the side faces of the lower portion of the head 10 will lie in direct contact with the walls 4 and 5 of the space 3 at a point just below the surface of the pavement and will adhere thereto, and that when the projecting portion of the head is mashed down or compressed it will be laterally spread so as to lap over the chamfered surfaces 6 and thus effectually seal the joint.

In practice the projecting portion of the head 10 may be compressed or ironed down by means of a suitable tool, or may be left to be compressed or ironed down by the wheels of vehicles passing over the completed pavement. In either case the head will be compacted and spread laterally and caused to adhere to the corners of the walls 4 and 5 and to the adjacent surfaces of the walls down to the line of the upper edges of the felt layers 9, while the crown of the head will also be expanded laterally so as to arch over the top of the joint and lap over upon the upper faces of the pavement elements 1 and 2, thus making a continuous tread over the surface of the joint for the smooth passage of rolling traffic.

Figure 4:
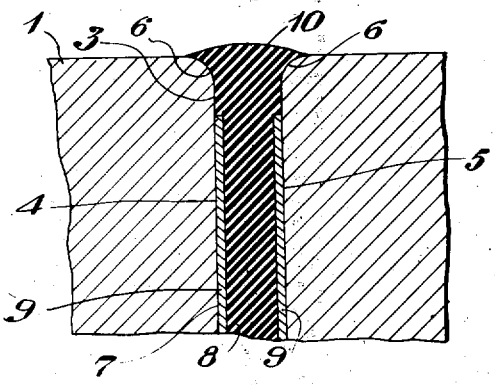
Fig. 4 is a view similar to Fig. 3, showing the mashable head or top of the filler ironed down to close and seal the joint.

An important feature of my invention resides in the form and construction of the head or projecting end 10 of the composite filler strip. As this head or projecting top, owing to its lateral expansion or increased width, contains a considerable amount of the asphalt material, it will be understood that when the head is crushed or ironed down all adjacent surfaces will be filled with the asphaltic material, which also will adhere strongly to the sides of the joint, thus sealing the joint securely against the access of moisture and other foreign substances. Furthermore, when this excess material of the head is compacted, in the manner shown in Fig. 4, a tread surface of maximum durability and resistance to wear will be established. Another important advantage of the described construction is that when this form of head is compressed it will be spread or arched over the surface of the joint substantially in the form of a mushroom head, thereby providing a continuously smooth surface over the joint, ensuring the compression of the material into all joints under the pressure of traffic and a constant sealing of the joints under all conditions of service.

It will be observed that these advantages are gained not only by the provision of a head 10 of the form described, but also by terminating the felt or compressed fibre layers 9 below the top of the body of asphaltic material. By also having these felt layers terminate below the top of the pavement surface, these layers oppose any resistance or interference to the ironing of the asphaltic body down into direct contact with the walls of the joint, as would occur if the layers projected above the surface of the pavement. Furthermore, the layers are disposed at such a point that they will not be torn or damaged by the wheels of traffic, and will therefore always remain intact and permanently hold the asphaltic body stiffened to the desired degree. If the felt layers projected above the pavement, it will be obvious that their edges would be torn by the wheels of vehicles, and that they would not only present an unsightly appearance, but would prevent compression of the head and adhesion of the head to the pavement, the projecting edges of the felt also producing lumps causing bumps and jolting of the vehicles in their travel across the joints.

It will, of course, be understood that the filler strips or slabs may be made of any suitable thickness or length according to requirements, and it will be evident from the foregoing that my improved joint combines all of the advantages of the built up or sandwich joint and the solid asphalt joint, while free from the defects of both. The filler is not only sufficiently substantial to screed to, but the arched form of the compressed head also provides an excess amount of material which will permit of considerable initial wear and tear before the asphaltic material at the top of the joint is compressed into the plane of the pavement surface.

Having fully described my invention, I claim:—

1. An expansion joint filler comprising a body of asphaltic material of greater initial depth than the depth of adjacent pavement elements between which it is fitted, said block having layers of thin protective material upon its opposite faces to lie between the same and said pavement elements, said layers being arranged to terminate a substantial distance below the wear surfaces of the pavement elements and below the top of the block, leaving portions of the top of the block exposed for adhering contact with the adjacent faces of the pavement elements adjacent to and for a substantial distance below the wear surface of said pavement elements.

2. An expansion joint filler comprising a body of asphaltic material of a depth to project above the wear surfaces of adjacent paving elements between which it is fitted, said block having a head portion of greater thickness than the body of the block and arranged to contact with and adhere to the adjacent faces of said paving elements adjacent to and a substantial distance below the wear surfaces of said elements, and protective layers of thin material upon the sides of the block and arranged to lie between the same and said faces of the adjacent paving elements below the points of contact between the same and the head portion of the block.

3. An expansion joint filler comprising a body of asphaltic material having a head portion of substantial depth and of greater thickness than the body of the block and projecting laterally beyond the opposite faces thereof, and thin layers of protective material embedded in the side faces of the body of the block and lying below the laterally projecting surfaces of the head portion thereof.

4. An expansion joint filler comprising a thin slab of asphaltic material adapted to be placed in position between adjacent parts of a pavement to close the joint therebetween, and having a depth to project above the wear surfaces of the adjacent pavement parts between which it is fitted, said slab having a head portion of greater thickness than the body of the slab, and arranged to contact with and adhere to the adjacent faces of said pavement parts adjacent thereto, and a substantial distance below the wear surface of the said pavement, and protective layers of thin material secured to the sides of the slab and arranged to lie between the slab and wear surfaces of the adjacent pavement parts below the points of contact between the same, and the head portion of the slab.

5. An expansion joint filler comprising a thin slab of asphaltic material adapted to be placed in position between adjacent parts of a pavement to close the joints therebetween, and having a head portion of substantial depth and of greater thickness than the body of the slab, and projecting laterally beyond the opposite faces thereof, and thin layers of protective material embedded in the side faces of the body of the slab and lying below the laterally projecting surfaces of the head portion thereof.

6. An expansion joint filler comprising a body of plastic material of greater initial depth than the depth of the adjacent elements between which it is fitted, said body having a layer of thin protective material upon its face to lie between the same and the next adjacent element, said layer being arranged to terminate a substantial distance below the top surface of said next adjacent element and below the top of the body, leaving portions of the side of the body exposed for adhering contact with the adjacent face of said next adjacent element to and for a substantial distance below the surface of said element.

In testimony whereof I affix my signature.

HENRY C. RIEHLE.